United States Patent [19]

Newton et al.

[11] 3,817,537

[45] June 18, 1974

[54] IMPROVEMENTS IN OR RELATING TO THE PRODUCTION OF DISC RECORDS

[75] Inventors: George Charles Newton, Uxbridge; Alfred Luigi Westlake, Ashford; Frederick George Humphrey Elphick, Iver, all of England

[73] Assignee: EMI Limited, Hayes, Middlesex, England

[22] Filed: July 20, 1972

[21] Appl. No.: 273,549

[30] Foreign Application Priority Data

Aug. 5, 1971 Great Britain .................... 36746/71

[52] U.S. Cl. ............................. 274/46 R, 274/23 R

[51] Int. Cl. ............................................ G11b 3/00

[58] Field of Search ........................... 274/23, 13, 46

[56] References Cited

UNITED STATES PATENTS 831,606 9/1906 Edison ............................. 274/13 R 2,142,563 1/1939 Harris ................................. 274/13

*Primary Examiner*—Harry N. Haroian

*Attorney, Agent, or Firm*—Fleit, Gipple & Jacobson

[57] ABSTRACT

Disc records are produced by operating on a rotating layer of recording medium. The recording apparatus includes leading means for preparing the surface of the layer by planing away material to a fixed level, either in the form of a flat surface or in the form of a groove, and trailing means, in the form of a laser, for impressing information on the prepared surface. The leading and trailing means are disposed to operate on the surface at spaced positions which are located at opposite ends of a chord of a circle coaxial with the axis of rotation of the disc, and they are traversed across the surface in a direction parallel to the perpendicular bisector of the chord.

3 Claims, 4 Drawing Figures

IMPROVEMENTS IN OR RELATING TO THE PRODUCTION OF DISC RECORDS

The present invention relates to apparatus for the production of disc records, and to records produced thereby; it relates in particular to the form of record production in which the recording medium is prepared by leading means, for example, by cutting a spiral groove therein, and information is impressed on the prepared medium by trailing means which is held in spaced relationship to the leading means. The trailing means includes a laser source of a beam of coherent radiation and the beam is constrained to operate in the aforementioned spiral groove or upon the ridge which is the inverse thereof.

It is an object of the present invention to provide recording apparatus having means for causing the trailing means to follow accurately the path of the leading means.

According to the invention there is provided apparatus for producing disc records including means for rotating a layer of recording medium, leading means for preparing the surface of said layer by removing material therefrom to a fixed level, trailing means operable on the prepared surface for impressing information thereon, said trailing means including a laser focused onto said fixed level, said leading and trailing means being disposed to operate on the surface of the layer at spaced positions which are located at opposite ends of a chord of a circle coaxial with the axis of rotation of the layer, and in which means are provided for traversing said leading and trailing means across the surface of the layer in a direction parallel to the perpendicular bisector of said chord.

Figure 1:
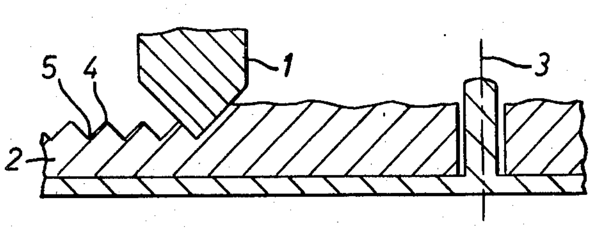
Figure 2:
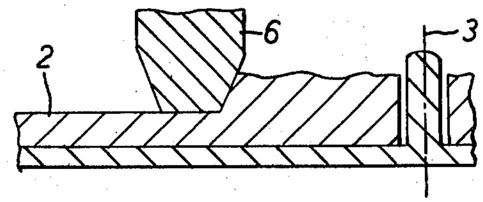
Figure 3:
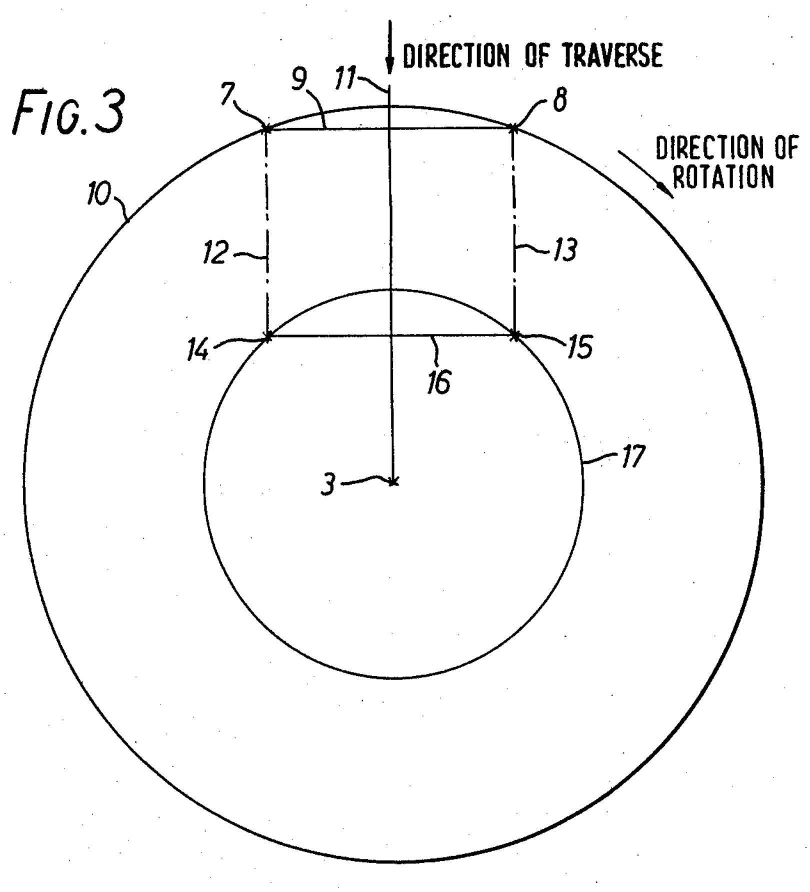
Figure 4:
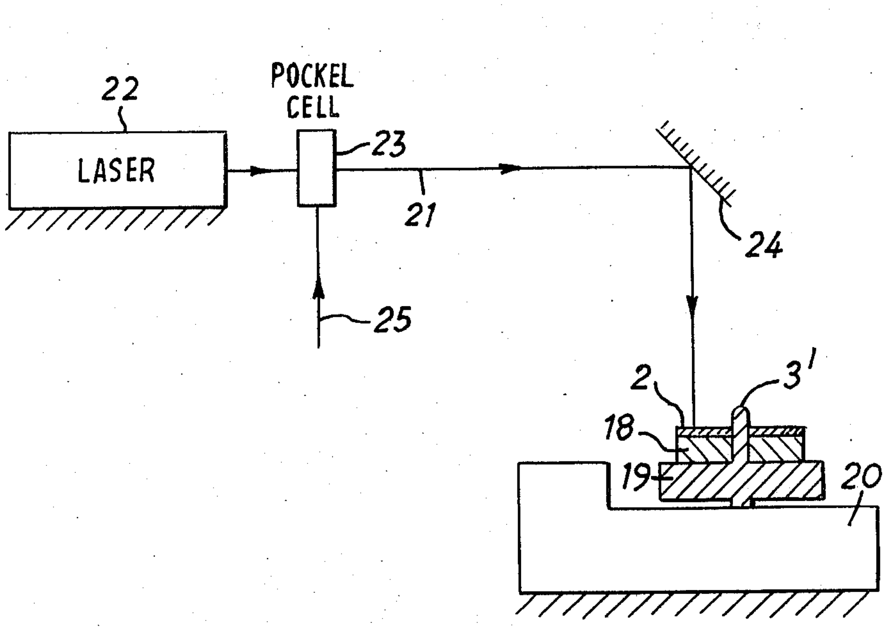

In order that the invention may be clearly understood and readily carried into effect, one embodiment thereof will now be described, by way of example only, with reference to the accompanying drawings of which:

FIG. 1 shows a leading means suitable for use with apparatus according to the invention and a portion of a substrate prepared thereby, FIG. 2 shows another form of leading means and a portion of a substrate prepared thereby, FIG. 3 shows, in plan view, the relative dispositions of leading and trailing means included in apparatus according to one example of the invention, and FIG. 4 shows, partly in block diagrammatic form and partly in section, apparatus in accordance with an example of the invention.

In all figures, similar elements are denoted by the same reference numerals.

Referring now to FIG. 1, a leading means is constituted by a "V"-shaped cutter 1. A recording medium 2 is rotated, for example by means of a recording lathe, relative to the cutter 1, about a central point 3 and the cutter, which is rigidly held so as to plane the medium 2 to a level surface, is caused to effectively progress in spiral fashion towards the central point 3. The radial component of the spiral motion is achieved by driving the medium 2 linearly relative to the cutter 1, or driving the leading and trailing means linearly relatively to the medium 2, and the pitch of a lead screw of said lathe or other similar device controlling the linear drive is arranged to be sufficiently fine that adjacent turns of the spiral are close relative to the slope of the cutting "V" so that the "land" between successive turns disappears and a sharp topped ridge 4 is formed below the level of surface irregularities in the medium 2. By this means, the spiral ridge 4 defines a spiral groove 5 and a trailing means, which includes, for example, a source of a beam of energy and is used for modulating the surface of the medium 2 in response to information to be recorded, can be caused to impress the modulation either on the ridge or in the groove.

The leading means shown in FIG. 2 is constituted by a gouge-shaped cutter 6 which forms a substantially flat surface on the medium 2, again overcoming surface irregularities therein. The trailing means in this case is arranged to impress the modulation on the medium 2 in a spiral pattern of deformations of the prepared, flat surface.

In order that the information to be recorded can be accurately laid down, the present invention provides apparatus for causing the trailing means to follow accurately the path of the leading means. The leading and trailing means are thus mounted in the respective relative dispositions with respect to the recording medium as shown in FIG. 3. The centres of the leading and trailing means (as operative on the medium) are indicated at 7 and 8, respectively. It will be noted that the two points 7 and 8 lie at opposite ends of a chord 9 of a circle 10. The chord 9 is perpendicularly bisected by a radius line 11 drawn from the central point 3, since the points 7 and 8 are equidistant from, and on opposite sides of, the radius 11. As recording proceeds, the leading and trailing means are moved linearly relative to the record medium; the linear motion being parallel to the line 11 in the direction shown by the arrow marked "direction of traverse" and in such a way that the centres of the leading and trailing means effectively follow the respective trajectories shown by the parallel dot-dashed lines 12 and 13. It will be appreciated that, although in this example the leading and trailing means traverse over the recording medium, the converse arrangement, i.e., the record medium moving linearly relative to the two means, could alternatively be used. When the two means occupy their furthest traverse positions from the positions shown at 7, 8 in FIG. 3, the centres of the leading and trailing means (as operative on the medium) occupy the positions 14 and 15 respectively, at either end of a chord 16 of a circle 17. The chord 16, like chord 9, is perpendicularly bisected by the radius line 11. Thus, the trailing means is constrained to follow accurately the path of the leading means. It will be appreciated that the above argument holds only for apparatus in which the linear progression of the leading and trailing means, in the traverse direction shown by the arrow, on each revolution of the medium 2 is sufficiently small that, for example considering the points 7 and 8 in FIG. 3, the trailing means has moved only a small distance inside the circle 10 by the time the medium which was prepared by the leading means at point 7 passes under point 8. This limitation can be reduced by shortening the distance between the leading and trailing means (i.e., reducing the length of chords 9 and 16).

The source of energy for the trailing means is a laser, the beam of which is arranged to deform the surface of the recording medium. By suitable arrangement of the focussing of the beam and modulation of the strength of the beam in response to modulating signals, the pattern recorded by the deformations of the surface can be determined. It is advantageous to maintain the beam in focus on the prepared medium, but with low power, between modulation pulses since this expedient tends to assist in smoothing the unmodulated surface. Such low power, continuous action can be achieved, for example, either by using a beam splitting device to by-pass part of the laser beam or by biassing the modulation signal so that the beam is not reduced to zero power between pulses.

Reference will now be made in FIG. 4 which shows, mainly in block diagrammatic form, part of apparatus according to one example of the invention.

The recording medium 2 is in the form of a lacquer carried on a substrate 18 which may be, for example, of aluminium. The lacquer 2 and substrate 18 together form a blank recording disc of the kind commonly used for sound recording. The blank disc is seated on a turntable 19 which forms part of a recording lathe 20 which, in addition to providing rotation of the turntable 19 about its central spindle 3', is capable of imparting a left to right traverse to the leading and trailing means relative to the turntable by means of a lead-screw which is not shown. In this example, the lathe 20 comprises a Scully automatic disc recording machine arranged to provide a rotational speed of 180 rpm and a traverse rate of approximately 10 microns per revolution.

The leading means (not shown) or cutting stylus, is mounted on the lathe so that its centre of operation on the lacquer 2 is initially disposed as shown at 7 in FIG. 3. It will be appreciated that, because of the sectional view taken in FIG. 4 through the disc and turntable, the leading means cannot be seen in this latter figure.

The trailing means comprises a laser beam 21 which is, in this example, derived from a "Spectra Physics" Argon ion continuous wave laser type 165; the laser being shown as a block 22. The beam 21 is passed to the medium 2 via a Pockel cell 23 and an angled plane mirror 24. Optical focusing means can be provided if desired. The Pockel cell 23 is such that, in dependence upon electrical signals fed thereto along a line 25, the intensity of the beam 21 can be varied, thereby to deform the surface of lacquer 2 to a greater or lesser extent.

The laser beam is constrained to be initially incident on the medium 2 at a position corresponding to 8 in FIG. 3 and the traversal of the leading and trailing means causes the beam to follow the trajectory 13 (see FIG. 3).

What we claim is:

1. Apparatus for producing disc records including means for rotating a layer of recording medium, leading means for preparing the surface of said layer by removing material therefrom to a fixed level, trailing means operable on the prepared surface for impressing information thereon, said trailing means including a laser focused onto said fixed level, said leading and trailing means being disposed to operate on the surface of the layer at spaced positions which are located at opposite ends of a chord of a circle coaxial with the axis of rotation of the layer, and in which means are provided for traversing said leading and trailing means across the surface of the layer in a direction parallel to the perpendicular bisector of said chord.

2. Apparatus according to claim 1 in which said leading means produces a groove in said surface at said fixed level.

3. Apparatus according to claim 1 in which said leading means produces a plane surface at said fixed level.

* * * * *